3,117,858
PRODUCTION OF ANHYDROUS NITROGEN SOLUTIONS

Robert A. Shurter, Jr., Charles D. Goodale, and Jerome L. Martin, Terre Haute, Ind., assignors to Commercial Solvents Corporation, New York, N.Y., a corporation of Maryland
No Drawing. Filed Sept. 28, 1959, Ser. No. 842,571
11 Claims. (Cl. 71—59)

Our invention relates to a process for the production of substantially anhydrous nitrogen solutions. More particularly, it relates to a method for the production of substantially anhydrous nitrogen solutions from ammonium nitrate and ammonia.

Nitrogen in assimilable form is one of the basic requirements for plant life and has long been used in various forms for this purpose. One of the forms commonly used in the past has been an aqueous solution of ammonia and ammonium nitrate. Such compositions have been widely used both for direct application to the soil and, with neutralization of the free ammonia, in the producton of solid mixed, nitrogen-containing fertilizers. The production, storage, and use of aqueous nitrogen solutions, however, have been subject to various disadvantages including the costs and other disadvantages inherent in the storage and transportation of a product which contains substantial quantities of water, which is corrosive, which has low nitrogen content, etc. These disadvantages in the use of nitrogen solutions previously available have been largely and in some cases entirely overcome by the discovery and utilization of our new process for the production of substantially anhydrous nitrogen solutions. The substantially anhydrous nitrogen solutions produced by our new process are substantially less corrosive than the nitrogen solutions of the prior art and since they occupy substantially smaller volumes, they are less expensive to store and transport than the previously commercially available nitrogen solutions. The substantial absence of water from the nitrogen solutions is a highly advantageous factor in shipping and when the nitrogen solutions are to be used in the production of mixed fertilizers. When using conventional nitrogen solutions, the amount of solution nitrogen that can be added to a mixed fertilizer is limited by the excessive liquid phase resulting from the combination of the temperature increase from the heat of reaction of the free ammonia with acidic compounds and the water introduced as a component of the solution. The heat of reaction increases the temperature of the mixture so that more and more of the water-soluble salts are dissolved in the water, thus rapidly increasing the liquid phase to a point where the addition of the conventional solution must be discontinued to avoid producing an unmanageable, wet, muddy mass. With our substantially anhydrous nitrogen ammoniating solutions, appreciably more solution-nitrogen can be employed without producing this excessive and objectionable amount of liquid phase. With these solutions, there is no added water from the solution and therefore only the heat of reaction determines the amount of liquid phase. The greater heat developed per unit weight of material permits the evaporation of substantial quantities of any water which is added in the form of an aqueous solution of acid such as sulfuric or phosphoric or as moisture content of the solids added. Ammonium nitrate and other water-soluble salts present become more soluble as the temperature increases. Increase in temperature (from heat of reaction) tends to evaporate moisture which increases the concentration of the salt solution. As this concentration increases, any moisture present becomes more and more difficult to remove, thus tending to stabilize the amount of liquid phase in the fertilizer at the desired point for best granulation.

Use of a substantially adhydrous nitrogen solution permits the production of nitrogen-containing solid fertilizer materials with minimum or no recirculation and with no supplemental drying in many cases where it was not possible with previously commercially available nitrogen solutions. Our new product, thus, provides a substantially simpler and cheaper method for the production of solid fertilizer materials than was possible using a previously available combination of nitrogen solutions and solid nitrogen materials. Such advantages have, previous to our invention, been unavailable because of lack of a suitable method for the production of substantially anhydrous nitrogen solutions.

We have discovered that substantially anhydrous nitrogen solutions ranging in composition from approximately 15 to 60% by weight ammonia and approximately 85 to 40% ammonium nitrate can be prepared by adding to substantially anhydrous gaseous but preferably liquid ammonia substantially anhydrous ammonium nitrate as molten or as the I, II, III, and IV crystalline forms, i.e., crystalline forms which exist at or above approximately −0.6° F., the operation being carried out under controlled conditions of temperature and pressure. The temperature is preferably maintained approximately 5° F. above the temperature at which the substantially anhydrous nitrogen solution salts out. We prefer to operate at a pressure approximately at or above the vapor pressure of the substantially anhydrous nitrogen solution at the operating temperature. The temperature may be regulated either by exchange cooling (refrigeration or water) or by the controlled evaporation of part of the ammonia from the substantially anhydrous nitrogen solution.

In carrying out our process for the production of our new and improved form of substantially anhydrous nitrogen solutions, it is important that the ammonium nitrate be held at a temperature of −0.6° F. or above for a sufficient time to permit the ammonium nitrate to form the proper crystalline form or forms. Unless the proper crystalline form or forms are used, the final product of substantially anhydrous nitrogen solution is found to have a substantially higher salting out point with the result that the resulting nitrogen solution precipitates solid ammonium nitrate at a temperature sufficiently high to make the lower ammonia-content nitrogen solutions practically useless for most purposes. Our new substantially anhydrous nitrogen solutions prepared as above described from liquid and crystalline forms I, II, III and IV are found to have salting out points approximately 8–15° F. below those made from ammonium nitrate crystalline form V, i.e., ammonium nitrate at or maintained below the temperature of approximately −0.6° F., or approximately 30° F. below the solutions described in the International Critical Tables. The tables are published for instance, in vol. IV, page 44, McGraw-Hill, New York, 1928, and are reproduced in Table I below.

Table I

Mole percent of ammonium
nitrate in ammonia:             Salting out point, ° C.
    32.3 (~69.2 weight percent)__ −30.0 (−22° F.).
    36.9 (~73.3 weight percent)__ −10.5 (13° F.).
    38.3 (~74.5 weight percent)__ 0 (32° F.).
    45.9 (~80.2 weight percent)__ +33.3 (92° F.).
    47.0 (~80.7 weight percent)__ 35.9 (96.8° F.).
    53.8 (~84.6 weight percent)__ 68.8 (156° F.).
    67.3 (~90.6 weight percent)__ 94.0 (2012° F.).

We can carry out our new process for the production of substantially anhydrous nitrogen solutions in various ways and hence it is understood that the specific procedures described herein are solely for the purpose of illustration and that our process is not limited to the specific conditions outlined herein.

According to one preferred modification, we first place the required amount of substantially anhydrous solid ammonium nitrate of either crystalline I, II, III or IV forms, and preferably in finely divided form, in a mixing tank which is a closed vessel and preferably provided with means for mixing the contents thereof either by an agitator or by means of a pump to circulate the liquid contents of the mixing tank, or both. It is desirable, also, to provide the mixing tank with means for regulating the pressure therein and means for heat removal, either internal or external. The amount of substantially anhydrous ammonia required to give the desired ratio of ammonia and ammonium nitrate in the product is added to the ammonium nitrate in the mixing tank. The contents are mixed either by means of an agitator or by means of a circulating pump referred to above, the contents of the tank being maintained preferably at any desired temperature above the salting out point consistent with the pressure desired. In lieu of the refrigeration means discussed above, a desired temperature and pressure can be maintained in the mixing tank during the mixing operation by permitting the regulated escape of ammonia vapor therefrom through a suitable pressure control valve or vent.

An alternate method for carrying out our process for the production of substantially anhydrous nitrogen solutions consists of first placing in a closed or open mixing tank a previously prepared solution of substantially anhydrous nitrogen solution prepared from substantially anhydrous liquid ammonia and substantially anhydrous ammonium nitrate liquid or of crystalline I, II, III, or IV forms and simultaneously continuously adding to said solution substantially anhydrous ammonia and substantially anhydrous solid ammonium nitrate of crystalline I, II, III, or IV forms in comminuted or granular form in the proportions necessary to give a nitrogen solution of the desired composition. The solution to which the ammonia and the ammonium nitrate is added is maintained in a state of agitation usually by means of a mechanical agitator or by means of a circulating pump, or both, and the temperature and pressure are regulated as described above in the case where a closed vessel is used. If an open vessel is used, temperature is maintained above the salting out point and at or below the boiling point of the solution. Obviously, all compositions in the range of 15–60% ammonia content cannot be made by the open tank method. Substantially anhydrous nitrogen solution of the desired composition is continuously withdrawn from the mixing tank, or circulating line, and transferred to a storage tank where it can be blended to a different composition by the addition or evaporation of substantially anhydrous ammonia, if desired.

We can also produce our substantially anhydrous nitrogen solutions by pumping substantially anhydrous molten ammonium nitrate at a temperature below approximately 450° F. into a closed vessel through which a turbulent stream of previously prepared substantially anhydrous nitrogen solution prepared from substantially anhydrous ammonium nitrate of liquid or crystalline I, II, III, or IV forms and containing approximately 15% to approximately 60% ammonia and approximately 85% to approximately 40% ammonium nitrate of the forms specified above is circulated. Substantially anhydrous ammonia is simultaneously added in the proper proportion to give a substantially anhydrous nitrogen solution of a desired composition. A quantity of solution approximately equal to the total quantity of ammonia and ammonium nitrate added is removed continuously. Cooling is supplied by controlled vaporization of ammonia from the solution with or without subsequent ammonia recovery or by cooling to control the temperature and pressure in the mixing vessel. The molten ammonium nitrate is added at a pressure not over approximately 200 p.s.i.g. because of the known hazard of maintaining molten ammonium nitrate under pressure. The pressure is also maintained at the minimum pressure commensurate with good operating efficiency, production and capacity, etc.

In any of the procedures described above, the ammonia is preferably introduced into the mixing tank from a sparger located near the bottom of the tank or into the circulating line ahead of the cooler. The molten or finely divided solid ammonium nitrate is preferably introduced into the mixing tank near the top of the tank.

The ammonia content of substantially anhydrous nitrogen solutions as made by any particular method is determined by whether or not the operation can be carried out under elevated pressures. If, for example, the solution of the ammonium nitrate in the liquid ammonia is effected at atmospheric pressure in either equipment open to the air or connected to ammonia recovery equipment, the minimum concentration of ammonia that can be employed is 19.5% and the maximum possible temperature is approximately 79° F. A tank operating at this temperature will flash cool of its own accord to maintain constant temperature and hence will require ammonia recovery for efficient and economic operation. In general, the rate of solution under such conditions will be slow with the result that a considerable amount of solids in the slurry form will be present at all times with the result that filtration will be necessary for recovery of clear, substantially anhydrous nitrogen solution.

The maximum concentration of ammonia at which a mixing tank operated at atmospheric pressure can be used will be 100% ammonia, since ammonia can be flash cooled to a low enough temperature to leave a head of liquid ammonia. Such a concentration of ammonia, however, is not in general practical to produce nitrogen solutions containing over 30% ammonia because the low temperatures involved require extensive insulation and facilities for recovery of large amounts of ammonia vapor.

The use of mixing equipment permitting carrying out the operation under pressure serves to increase the permissible temperature level of operation. Since the use of pressure raises the boiling point above the freezing point of 19.5% solution, the ammonia content can be reduced further until the freezing point again approaches the new boiling point at the given pressure thus making it possible to reduce the theoretical limiting ammonia concentration under pressure operation to almost 0% ammonia. In general, we have found that the most practical and economical ammonia concentration is of the order of 15–60%. While higher pressures can be used, we have found that pressures not higher than 200 p.s.i.g. are both economical and practical.

We have not found that either the feasibility and efficiency of the operation or the character of the final product is materially affected by such factors as sequence or method of mixing the materials (ammonia to solid or liquid ammonium nitrate, solid or liquid ammonium nitrate to ammonia, solid or liquid ammonium nitrate and ammonia simultaneously mixed), single or multiple step compounding, method of temperature regulation (evaporative cooling, or exchange cooling), combinations of pressure and no pressure procedures, so long as both the ammonia and ammonium nitrate are substantially anhydrous and so long as the ammonium nitrate is in either the liquid or in the I, II, III, or IV crystalline forms, which we have found to be critical to both our process and the final product.

Other forms of solid nitrogen such as urea or sodium nitrate can replace part or all of the substantially anhydrous ammonium nitrate if desired subject, of course, to the solubility limits of these materials in substantially anhydrous ammona. Although the high solubility and relatively low vapor pressure of substantially anhydrous ammonia solutions of ammonium nitrate make the latter material the preferred form of solid nitrogen to be dissolved in making these substantially anhydrous nitrogen solutions, we can effectively substitute urea for part or all of the ammonium nitrate in any of the operations described above. In addition, urea acts as a salting out point depressant when added to the essentially anhydrous ammonia-ammonium nitrate solution.

Now having described our invention, what we claim is:

1. Process for the production of substantially anhydrous nitrogen solutions containing from about 15% to about 60% ammonia and from about 85% to about 40% ammonium nitrate which comprises mixing substantially anhydrous ammonium nitrate selected from the group consisting of molten, crystalline form I, crystalline form II, crystalline form III and crystalline form IV ammonium nitrate at a temperature not lower than approximately −0.6° F. to prevent the formation of crystalline form V, with substantially anhydrous ammonia; and recovering said anhydrous nitrogen solution which is characterized by a salting out temperature of about 30° F. below corresponding nitrogen solutions as determined from the International Critical Tables set forth in Table I.

2. The process of claim 1 wherein the ammonia is liquid.

3. The process of claim 1 wherein the substantially anhydrous ammonium nitrate and substantially anhydrous ammonia are mixed in a vessel maintained at a pressure not below the vapor pressure of the resulting substantially anhydrous nitrogen solution and maintained at a temperature not below the solution's salting out point.

4. The process of claim 1 wherein the temperature in the vessel in which the substantially anhydrous ammonium nitrate and the substantially anhydrous ammonia are mixed is maintained at not below the salting out point of the resulting substantially anhydrous nitrogen solution by means of exchange cooling.

5. The process of claim 2 wherein the temperature in the vessel in which the substantially anhydrous ammonium nitrate and the substantially anhydrous liquid ammonia are mixed is maintained at not below the salting out point of the resulting substantially anhydrous nitrogen solution by controlled evaporation of ammonia vapor from the substantially anhydrous nitrogen solution.

6. The process of claim 2 wherein the mixing of the substantially anhydrous ammonium nitrate and the substantially anhydrous liquid ammonia is effected at approximately atmospheric pressure.

7. The process of claim 2 wherein the mixing of the substantially anhydrous ammonium nitrate in the substantially anhydrous liquid ammonia is effected at pressures in excess of atmospheric pressure.

8. A process for the production of substantially anhydrous nitrogen solutions containing approximately 15% to approximately 60% ammonia and approximately 85% to approximately 40% ammonium nitrate which comprises adding substantially solid ammonium nitrate selected from the group consisting of molten, crystalline form I, crystalline form II, crystalline form III and crystalline form IV ammonium nitrate at a temperature not below approximately −0.6° F., to prevent the formation of crystalline form V, and substantially anhydrous ammonia to an agitated solution of substantially anhydrous nitrogen solution cooled to a temperature above the salting out point of the said solution at the pressure under which the solution is maintained; and recovering said anhydrous nitrogen solution which is characterized by a salting out temperature of about 30° F. below corresponding nitrogen solutions as determined from the International Critical Tables set forth in Table I.

9. The process of claim 8 wherein the substantially anhydrous ammonium nitrate is in the molten state.

10. A process for the production of substantially anhydrous nitrogen solutions containing from about 15% to about 60% ammonia and from about 85% to about 40% ammonium nitrate which comprises holding ammonium nitrate at a temperature not lower than approximately −0.6° F. for a sufficient time to permit the ammonium nitrate to provide ammonium nitrate selected from the group consisting of molten, crystalline from I, crystalline form II, crystalline form III, and crystalline form IV ammonium nitrate, and mixing said ammonium nitrate in a substantially anhydrous form at a temperature not lower than approximately −0.6° F., to prevent the formation of crystalline from V, with substantially anhydrous ammonia to provide a substantially anhydrous nitrogen solution; and recovering said anhydrous nitrogen solution which is characterized by a salting out temperature of about 30° F. below corresponding nitrogen solutions as determined from the International Critical Tables set forth in Table I.

11. In a process for preparing mixed fertilizers from nitrogen solutions, the improvement which comprises preparing the nitrogen solution by holding ammonium nitrate at a temperature not lower than approximately −0.6° F. for a period of time sufficient to permit the ammonium nitrate to provide ammonium nitrate selected from the group consisting of molten, crystalline form I, crystalline form II, crystalline form III, and crystalline form IV ammonium nitrate, and mixing said ammonium nitrate in a substantially anhydrous form at a temperature not lower than approximately −0.6° F., to prevent the formation of crystalline form V, with substantially anhydrous ammonia to provide a substantially anhydrous nitrogen solution; and recovering said anhydrous nitrogen solution which is characterized by a salting out temperature of about 30° F. below corresponding nitrogen solutions as determined from the International Critical Tables set forth in Table I.

References Cited in the file of this patent

UNITED STATES PATENTS

| | | |
|---|---|---|
| 573,968 | Craig | Dec. 29, 1896 |
| 2,023,199 | Harvey | Dec. 3, 1935 |
| 2,067,931 | Kniskern et al. | Jan. 19, 1937 |
| 2,077,469 | Fazel | Apr. 20, 1937 |
| 2,657,977 | Stengel et al. | Nov. 3, 1953 |

UNITED STATES PATENT OFFICE
CERTIFICATE OF CORRECTION

Patent No. 3,117,858                 January 14, 1964

Robert A. Shurter, Jr., et al.

It is hereby certified that error appears in the above numbered patent requiring correction and that the said Letters Patent should read as corrected below.

Column 2, line 1, for "adhydrous" read -- anhydrous --; line 66, for "(2012° F.)" read -- (201.2° F.) --; column 4, line 66, for "ammona" read -- ammonia --; column 6, line 17, second occurrence, and line 22, for "from", each occurrence, read -- form --.

Signed and sealed this 16th day of June 1964.

(SEAL)
Attest:

ERNEST W. SWIDER                   EDWARD J. BRENNER
Attesting Officer                    Commissioner of Patents